United States Patent
Madani et al.

(10) Patent No.: US 11,316,345 B2
(45) Date of Patent: Apr. 26, 2022

(54) PREDICTIVE VOLTAGE STABILITY OF A POWER SYSTEM POST-CONTINGENCY

(71) Applicant: Quanta Technology, LLC, Raleigh, NC (US)

(72) Inventors: Vahid Madani, Crockett, CA (US); Xinyu Tony Jiang, Morrisville, NC (US); Damir Novosel, Cary, NC (US); Bozidar Avramovic, McLean, VA (US)

(73) Assignee: Quanta Associates, L.P., Houston, TX (US)

( * ) Notice: Subject to any disclaimer, the term of this patent is extended or adjusted under 35 U.S.C. 154(b) by 494 days.

(21) Appl. No.: 15/891,524

(22) Filed: Feb. 8, 2018

(65) Prior Publication Data
US 2019/0245349 A1    Aug. 8, 2019

(51) Int. Cl.
*H02J 3/24* (2006.01)
*G01R 19/25* (2006.01)
(Continued)

(52) U.S. Cl.
CPC .......... *H02J 3/24* (2013.01); *G01R 19/2513* (2013.01); *G06F 30/367* (2020.01); *H02J 3/12* (2013.01);
(Continued)

(58) Field of Classification Search
CPC .. H02J 3/001; H02J 3/0012; H02J 3/24; H02J 2293/20; H02J 13/0006; G06F 2119/06; G06F 30/367; G01R 19/2513
See application file for complete search history.

(56) References Cited

U.S. PATENT DOCUMENTS

| 8,239,070 B1* | 8/2012 | Schlueter | H02J 3/00 700/286 |
| 2011/0022240 A1* | 1/2011 | Rajapaske | G05B 23/0254 700/287 |

(Continued)

FOREIGN PATENT DOCUMENTS

| EP | 1261096 A1 | 11/2002 |
| EP | 3163706 A1 | 5/2017 |

OTHER PUBLICATIONS

M. Parniani, J. H. Chow, L. Vanfretti, B. Bhargava and A. Salazar, "Voltage Stability Analysis of a Multiple-Infeed Load Center Using Phasor Measurement Data," 2006 IEEE PES Power Systems Conference and Exposition, Atlanta, GA, 2006, pp. 1299-1305. (Year: 2006).*

(Continued)

*Primary Examiner* — Boris Gorney
*Assistant Examiner* — Pursottam Giri
(74) *Attorney, Agent, or Firm* — Murphy, Bilak & Homiller, PLLC

(57) ABSTRACT

A voltage stability prediction system is configured to predict voltage stability of a power system under a contingency. The voltage stability prediction system in this regard may execute model-based contingency analysis using a model of the power system to predict, as of a first time, voltage stability of the power system post-contingency. The voltage stability prediction system also obtains, from phasor measurement units (PMUs) in the power system, synchrophasor measurements that indicate, as of a second time later than the first time, phasors in the power system pre-contingency. Further, based on the model-based contingency analysis and the synchrophasor measurements, the voltage stability prediction system predicts, as of the second time, voltage stability of the power system post-contingency.

22 Claims, 10 Drawing Sheets

(51) Int. Cl.
*H02J 3/12* (2006.01)
*G06F 30/367* (2020.01)
*H02J 3/00* (2006.01)
*G06F 119/06* (2020.01)
*H02J 13/00* (2006.01)

(52) U.S. Cl.
CPC ........... *G06F 2119/06* (2020.01); *H02J 3/001* (2020.01); *H02J 13/0006* (2013.01); *H02J 2203/20* (2020.01)

(56) References Cited

U.S. PATENT DOCUMENTS

| | | | | |
|---|---|---|---|---|
| 2011/0066301 | A1* | 3/2011 | Donolo | H02J 3/18 700/292 |
| 2014/0244065 | A1 | 8/2014 | Biswas et al. | |
| 2019/0137550 | A1* | 5/2019 | Zhang | H02J 3/0012 |

OTHER PUBLICATIONS

J. De La Ree, V. Centeno, J. S. Thorp and A. G. Phadke, "Synchronized Phasor Measurement Applications in Power Systems," in IEEE Transactions on Smart Grid, vol. 1, No. 1, pp. 20-27, Jun. 2010 (Year: 2010).*

X J. De La Ree, V. Centeno, J. S. Thorp and A. G. Phadke, "Synchronized Phasor Measurement Applications in Power Systems," in IEEE Transactions on Smart Grid, vol. 1, No. 1, pp. 20-27, Jun. 2010. (Year: 2010).*

W. Xu and Y. Mansour, "Voltage stability analysis using generic dynamic load models," in IEEE Transactions on Power Systems, vol. 9, No. 1, pp. 479-493, Feb. 1994. (Year: 1994).*

M. Parniani, J. H. Chow, L. Vanretti, B. Bhargava and A. Salazar, "Voltage Stability Analysis of a Multiple-Infeed Load Center Using Phasor Measurement Data," 2006 IEEE PES Power Systems Conference and Exposition, Atlanta, GA, 2006, pp. 1299-1305. (Year: 2006).*

Bonini Neto A., and Alves D. A., "Studies of Contingencies in Power Systems through a Geometric Parameterization Technique, Part II: Performance Evaluation." World Journal Control Science and Engineering, vol. 2, No. 1 (2014): 25-34. doi: 10.12691/wjcse-2-1-5. (Year: 2014).*

R. O. Burnett, M. M. Butts and P. S. Sterlina, "Power system applications for phasor measurement units," in IEEE Computer Applications in Power, vol. 7, No. 1, pp. 8-13, Jan. 1994, doi: 10.1109/67.251311. (Year: 1994).*

* cited by examiner

OBTAIN, BASED ON THE MODEL-BASED CONTINGENCY ANALYSIS, A RATIO BETWEEN A POST-CONTINGENCY POWER TRANSFER LIMIT AS OF THE FIRST TIME AND A PRE-CONTINGENCY POWER TRANSFER LIMIT AS OF THE FIRST TIME
206A

OBTAIN, BASED ON THE SYNCHROPHASOR MEASUREMENTS, A PRE-CONTINGENCY POWER TRANSFER LIMIT AS OF THE SECOND TIME
206B

OBTAIN A POST-CONTINGENCY POWER TRANSFER LIMIT AS OF THE SECOND TIME, E.G., BY SCALING THE PRE-CONTINGENCY POWER TRANSFER LIMIT AS OF THE SECOND TIME BY THE RATIO
206C

CALCULATE, BASED ON THE POST-CONTINGENCY POWER TRANSFER LIMIT AS OF THE SECOND TIME, AN INDEX THAT INDICATES, AS OF THE SECOND TIME, VOLTAGE STABILITY OF THE POWER SYSTEM POST-CONTINGENCY
206D

FIG. 7

PREDICTIVE VOLTAGE STABILITY OF A POWER SYSTEM POST-CONTINGENCY

TECHNICAL FIELD

The present application relates generally to voltage stability of a power system, and relates more specifically to predicting voltage stability of a power system under a contingency.

BACKGROUND

A power system is a system of electrical components deployed to supply, transfer, store, and use electric power. In practice, potential load variations, equipment outages, transmission line losses, and other possible dynamic changes represent contingencies that could affect the ability of the power system to operate normally. Contingency analysis in this regard predicts the extent to which one or more postulated contingencies would affect the power system in the future. By analyzing the effects of contingencies in advance, before those contingencies occur, system operators are able to configure operating constraints to avoid triggering problematic contingencies. Operators may even be able to take corrective action so that certain contingencies no longer pose problems for the system.

Model-based contingency analysis requires a model of the power system, e.g., that models the power system topology and connectivity as well as the electrical characteristics of power system equipment. Analysis involves solving for the currents, voltages, and power flows that would exist in the system as modeled under different contingencies. This demands computational resources sufficient to analyze many hundreds of contingencies in large power systems, especially when the analysis is conducted for several operating states and loading levels and/or when a complete alternating current (AC) power flow is required for each contingency. Even with modern advances in computational power, analyzing a multitude of contingencies may take several minutes or more in practice.

SUMMARY

Embodiments herein predict the extent to which a postulated contingency would affect a power system in terms of voltage stability, using both model-based contingency analysis as well as synchrophasor measurements. The synchrophasor measurements in this regard may be exploited to provide post-contingency voltage stability predictions even during the time gaps between successive executions of the model-based contingency analysis. Indeed, some embodiments provide post-contingency voltage stability predictions at synchrophasor data rates, e.g., on the order of 5-150 predictions per second, so as to provide predictions much faster than approaches that use model-based contingency analysis alone.

More particularly, embodiments herein include a method performed by a voltage stability prediction system for predicting voltage stability of a power system under a contingency. The method in some embodiments may comprise executing model-based contingency analysis using a model of the power system to predict, as of a first time, voltage stability of the power system post-contingency. The method also comprises obtaining, from phasor measurement units (PMUs) in the power system, synchrophasor measurements that indicate, as of a second time later than the first time, phasors in the power system pre-contingency. The method further comprises based on the model-based contingency analysis and the synchrophasor measurements, predicting, as of the second time, voltage stability of the power system post-contingency.

Embodiments also include a voltage stability prediction system for predicting voltage stability of a power system under a contingency. The voltage stability prediction system in some embodiments is configured to execute model-based contingency analysis using a model of the power system to predict, as of a first time, voltage stability of the power system post-contingency. The voltage stability prediction system is also configured to obtain, from phasor measurement units (PMUs) in the power system, synchrophasor measurements that indicate, as of a second time later than the first time, phasors in the power system pre-contingency. The voltage stability prediction system is further configured to, based on the model-based contingency analysis and the synchrophasor measurements, predict, as of the second time, voltage stability of the power system post-contingency.

BRIEF DESCRIPTION OF THE DRAWINGS

FIG. 7 is a logic flow diagram for processing performed by the voltage stability prediction system according to still other embodiments.

DETAILED DESCRIPTION

Figure 1:
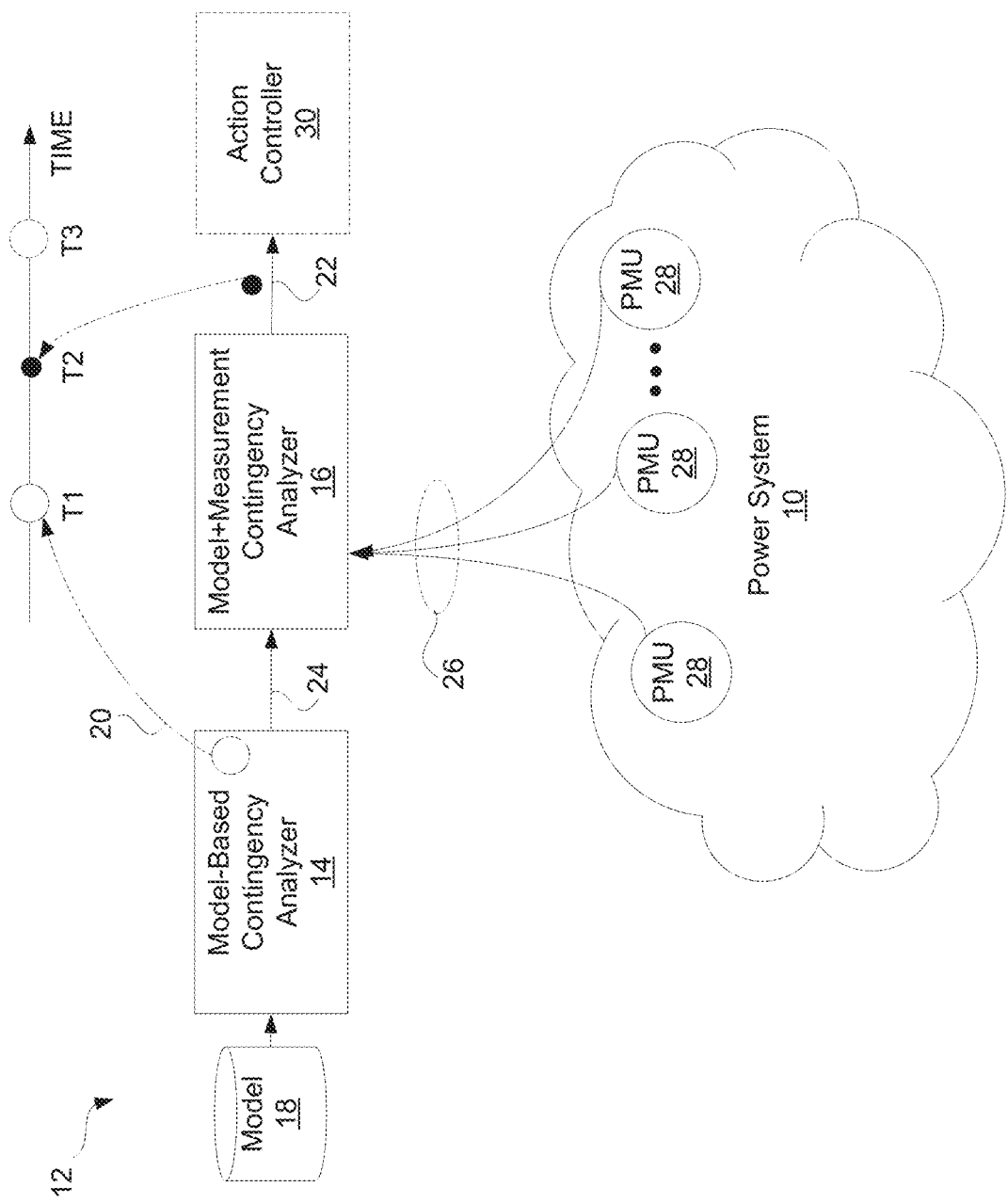
FIG. 1 is a block diagram of a voltage stability prediction system and a power system according to some embodiments.

FIG. 1 illustrates a power system 10 that includes electrical components deployed to supply, transfer, store, and use electric power. If the loads on the system 10 request more power than the system 10 can generate and transmit to the loads, the system 10 becomes unstable in terms of voltage. Such voltage instability threatens to evolve further into voltage collapse and cause system disruption and/or blackouts.

Potential load variations, equipment outages, transmission line losses, and other possible dynamic changes represent contingencies that could affect the voltage stability of the power system 10. A voltage stability prediction system 12 in this regard predicts the extent to which a postulated contingency would affect the voltage stability of the power system 10. That is, the system 12 predicts the extent to which the power system 10 would or would not be in danger of voltage instability if a certain contingency were to occur. Notably, the voltage stability prediction system 12 predicts the extent to which a contingency would affect the voltage stability of the power system 10, using both model-based contingency analysis as well as synchrophasor measurements.

More particularly, FIG. 1 shows the voltage stability prediction system 12 as including a model-based contingency analyzer 14 as well as a model+measurement contingency analyzer 16. The model-based contingency analyzer 14 is configured to execute model-based contingency analysis using a model 18 of the power system 10. The model 18 may model the power system topology, connectivity, and/or equipment electrical characteristics. Using this model 18, the model-based contingency analyzer 14 may for example solve for the currents, voltages, and power flows that would exist in the system as modeled under the contingency. As a result of this model-based contingency analysis, the analyzer 14 predicts voltage stability of the power system 10 post-contingency. That is, the analyzer 14 predicts the extent to which the power system 10 would be stable or unstable in terms of voltage if the contingency were to occur. The analyzer 14 predicts this as of a first time T1, e.g., by providing a prediction 20 at the first time T1 in the form of a voltage stability index such as a power margin.

In some embodiments, required processing time, resource constraints, or other factors may delay the time before the model-based contingency analyzer 14 is able to update its prediction of the system's voltage stability post-contingency. As shown in FIG. 1, for example, the analyzer 14 may not be able to update its prediction until a time T3, which may be for instance several minutes after the first time T1. According to one or more embodiments, though, the model+measurement contingency analyzer 16 advantageously predicts the power system's voltage stability post-contingency as of a second time T2, e.g., by providing a prediction 22 at the second time T2 which may be in the form of another voltage stability index such as a power margin. As shown in FIG. 1, this second time T2 at which the prediction 22 is made may be after the first time T1 but before the time T3 when the model-based contingency analyzer 14 would be able to update its prediction.

Towards this end, the model-based contingency analyzer's prediction 20 as of the first time T1 and/or one or more other values characterizing the power system 10 post-contingency are provided as output 24 representing the model-based contingency analysis to the model+measurement contingency analyzer 16. Based on the model-based contingency analysis, e.g., as represented by output 24, the model+measurement contingency analyzer 16 predicts as of the second time T2 the power system's voltage stability post-contingency.

Notably, the model+measurement contingency analyzer 16 also bases its post-contingency voltage stability prediction as of the second time T2 on synchrophasor measurements 26 that the analyzer 16 obtains (e.g., receives or derives) from phasor measurement units (PMUs) 28 in the power system 10. These synchrophasor measurements 26 indicate, as of the second time T2, phasors in the power system 10 pre-contingency, i.e., before or without occurrence of the contingency. The measurements 26 may for instance indicate voltage phasors, current phasors, and/or other phasors in the power system 10 pre-contingency, as measured locally by the PMUs 28 using a common time source for synchronization. The measurements 26 in this regard may each have respective tags indicating the measurements 26 were performed at or are otherwise attributable to the second time T2. The synchrophasor measurements 26 are acquired without reliance on a model of the power system 10 such that to the extent contingency analysis uses the measurements that aspects of contingency analysis may be considered model-free.

Figure 2:
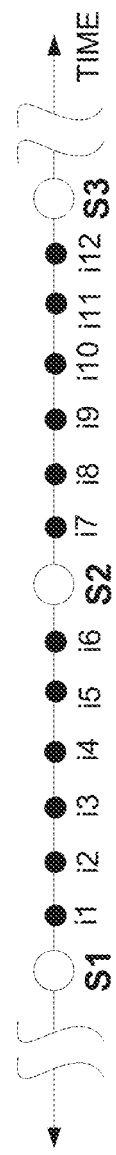
FIG. 2 is a block diagram of a timeline for post-contingency voltage stability predictions according to some embodiments.

The voltage stability prediction system 12 thereby exploits synchrophasor measurements 26 in some embodiments to provide one or more post-contingency voltage stability predictions 22 even during the time gaps between successive executions of the model-based contingency analysis. Indeed, some embodiments provide post-contingency voltage stability predictions 22 at synchrophasor data rates in real-time, e.g., on the order of 5-150 predictions per second, so as to provide predictions much faster than approaches that use model-based contingency analysis alone. FIG. 2 illustrates an example in a context where the model-based contingency analysis is executed periodically, with model+measurement contingency analysis providing post-contingency voltage stability predictions in the interim between successive executions of the model-based contingency analysis.

As shown in FIG. 2, the model-based contingency analyzer 14 periodically executes model-based contingency analysis to predict, at scheduled times S1, S2, S3, . . . , voltage stability of the power system 10 post-contingency, e.g., by providing predictions 20 at scheduled times S1, S2, S3, . . . in the form of voltage stability indices. At each of one or more intermediate times i1, i2, i3, . . . between successive ones of the scheduled times (e.g., S1 and S2), the model+measurement contingency analyzer 16 predicts voltage stability of the power system 10 post-contingency, e.g., by providing predictions 22 at intermediate times i1, i2, i3 . . . in the form of voltage stability indices. In some embodiments, for example, multiple intermediate times i1, i2, i3, . . . recur between the successive ones of the scheduled times (e.g., S1 and S2) at a rate between 5 and 150 times per second, such that predictions 22 are provided much more frequently than predictions 20.

Determining predictions 22 may involve for instance, for each intermediate time, obtaining from PMUs 28 synchrophasor measurements 26 that indicate (as of the intermediate time) phasors in the power system 10 pre-contingency. Based on those synchrophasor measurements 26 and the model-based contingency analysis executed to predict post-contingency voltage stability as of the last scheduled time before the intermediate time, the analyzer 16 may predict, as of the intermediate time, voltage stability of the power system 10 post-contingency. For example, to provide a post-contingency voltage stability prediction 22 at intermediate time i3, the analyzer 16 may base that prediction 22 on synchrophasor measurements 26 for time i3 and model-based contingency analysis executed to predict post-contingency voltage stability as of the last scheduled time S1. In some sense, then, embodiments may effectively leverage synchrophasor measurements 26 performed after model-based contingency analysis in order to extrapolate that model-based contingency analysis in time.

With post-contingency voltage stability predictions 20, 22 provided more frequently in time, e.g., so as to better reflect up-to-date voltage stability of the power system 10 post-contingency, actions may be taken more often and/or more appropriately for avoiding, mitigating the impact of, or otherwise controlling a problematic contingency. As shown in FIG. 1, for instance, the post-contingency voltage stability predictions 20 and/or 22 may be provided to an action controller 30. Based on the predictions 20 and/or 22, the action controller 30 may control one or more actions to be performed as needed to control the power system's voltage stability post-contingency and/or mitigate power system degradation or disturbance propagation post-contingency. This may involve the action controller 30, based on the predictions 20 and/or 22, controlling a prescribed action (e.g., load shedding) to be performed automatically. Alternatively or additionally, this may involve the action controller 30 simply controlling the display of information indicating the predictions 20 and/or 22, e.g., for review by system operators.

Figure 3:
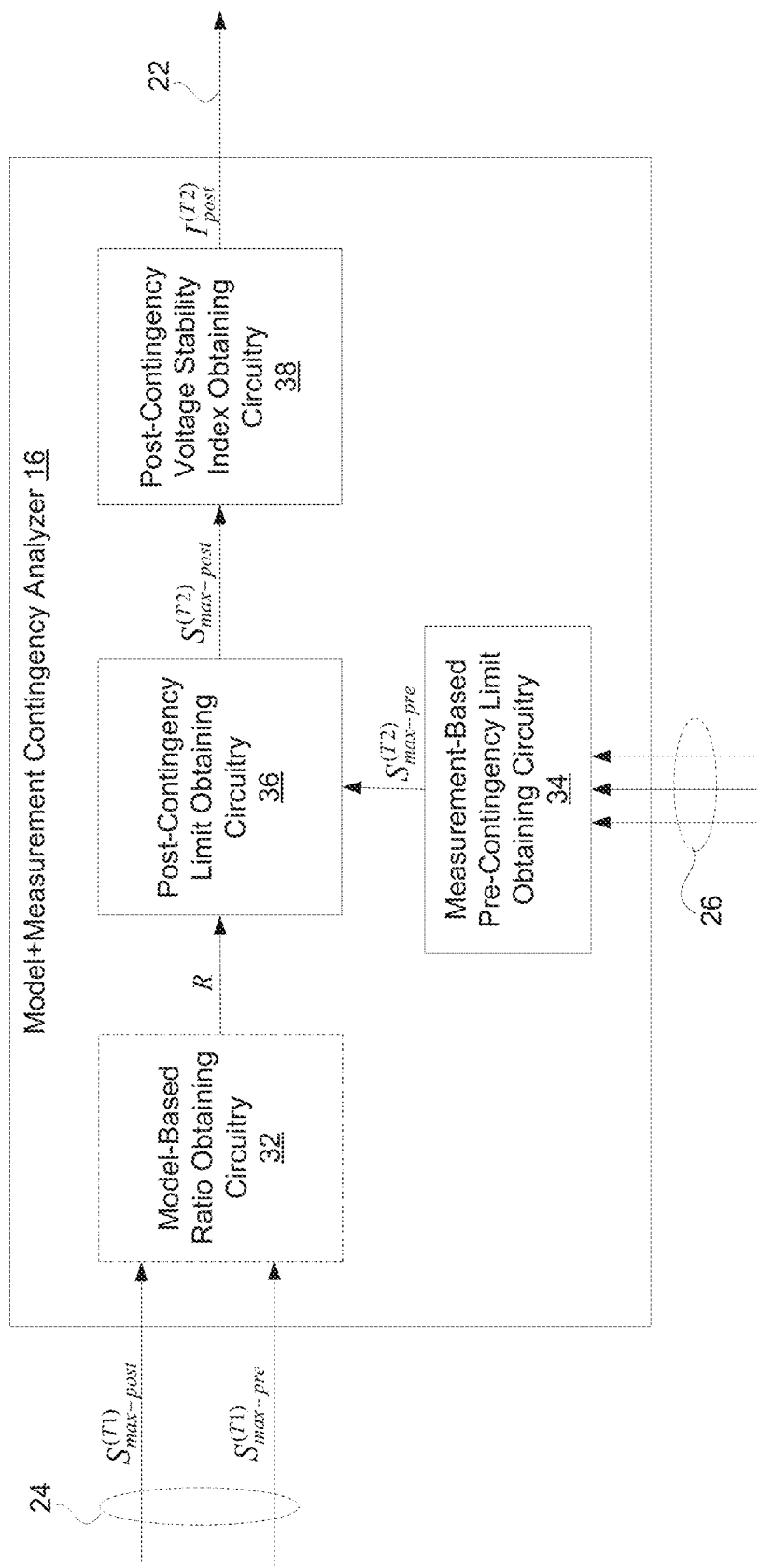
FIG. 3 is a block diagram of a model+measurement contingency analyzer according to some embodiments.

FIG. 3 illustrates additional details for how the model+ measurement contingency analyzer 16 predicts post-contingency voltage stability according to some embodiments. As shown, the analyzer 16 is configured to obtain a prediction 22 of post-contingency voltage stability as of the second time T2, e.g., in the form of a post-contingency voltage stability index $I_{post}^{(T2)}$. To do so, the analyzer 16 is configured to obtain, based on the model-based contingency analysis, a ratio R between a post-contingency power transfer limit $S_{max-post}^{(T1)}$ as of the first time T1 and a pre-contingency power transfer limit $S_{max-pre}^{(T1)}$ as of the first time T1, i.e., $R = S_{max-post}^{(T1)}/S_{max-pre}^{(T1)}$. This ratio R thereby reflects the ratio, as of the first time T1, between the maximum (reactive) power that the power system 10 can transfer after occurrence of the contingency and the maximum (reactive) power that the power system 10 can transfer before occurrence of the contingency. As shown in FIG. 1, for example, the analyzer 16 may include model-based ratio obtaining circuitry 32 that receives the post-contingency power transfer limit $S_{max-post}^{(T1)}$ and the pre-contingency power transfer limit $S_{max-pre}^{(T1)}$ from the model-based contingency analyzer 14, e.g., as output 24. In this case, the model-based ratio obtaining circuitry 32 may obtain the ratio R by actually computing it from the received limits. Alternatively, in other embodiments not shown, the analyzer 16 may receive the ratio R directly from the model-based contingency analyzer 14, e.g., as output 24. The analyzer 16 may then form its prediction 22 based on this ratio R and the synchrophasor measurements 26.

In some embodiments, for example as shown in FIG. 3, the analyzer 16 includes measurement-based pre-contingency limit obtaining circuitry 34. This circuitry 34 is configured to obtain, based on the synchrophasor measurements 26, a pre-contingency power transfer limit $S_{max-pre}^{(T2)}$ as of the second time T2. This limit $S_{max-pre}^{(T2)}$ indicates, as of the second time T2, the maximum (reactive) power that the power system 10 can transfer before the occurrence of the contingency. The analyzer 16 is configured to determine prediction 22 based on the ratio R and this pre-contingency power transfer limit $S_{max-pre}^{(T2)}$ as of the second time T2.

As shown in FIG. 3, for instance, the analyzer 16 includes post-contingency limit obtaining circuitry 36. This circuitry 36 is configured to obtain a post-contingency power transfer limit $S_{max-post}^{(T2)}$ which reflects, as of the second time T2, the maximum (reactive) power that the power system 10 can transfer after the occurrence of the contingency. The circuitry 36 is configured to obtain this limit $S_{max-post}^{(T2)}$ based on (e.g., as a function of) the ratio R and the pre-contingency power transfer limit $S_{max-pre}^{(T2)}$ as of the second time T2. In some embodiments, for example, the circuitry 36 calculates the post-contingency power transfer limit $S_{max-post}^{(T2)}$ by scaling the pre-contingency power transfer limit $S_{max-pre}^{(T2)}$ as of the second time T2 by the ratio R, i.e., $S_{max-post}^{(T2)} = S_{max-pre}^{(T2)} * R$. This calculation is based on the assumption that the ratio between post- and pre-contingency power transfer limits will be approximately the same at the first and second times T1, T2. The calculation therefore amounts to a first-order (i.e., linear) approximation of the post-contingency power transfer limit $S_{max-post}^{(T2)}$ as of the second time T2. The analyzer 16 in other embodiments may nonetheless compute a higher-order approximation of the limit $S_{max-post}^{(T2)}$, e.g., using one or more additional terms, in order to account for any non-linearity in the approximation.

FIG. 3 also shows that the analyzer 16 may further include post-contingency voltage stability index obtaining circuitry 38. This circuitry 38 may be configured to calculate the post-contingency voltage stability index $I_{post}^{(T2)}$ as of the second time T2, based on the post-contingency power transfer limit $S_{max-post}^{(T2)}$. The post-contingency voltage stability index $I_{post}^{(T2)}$ may be for instance a (reactive) power margin of the power system 10 post-contingency. In this case, then, the circuitry 38 may calculate the power margin as the difference between the post-contingency power transfer limit and the (reactive) power demanded by loads on the power system 10 as of the second time T2.

Note that while the above embodiments were described with respect to a single contingency, the voltage stability prediction may by performed with respect to one or more contingencies. For example, the voltage stability prediction system 12 may predict post-contingency voltage stability as of the second time T2, for each of one or more contingencies in a list. Alternatively or additionally, the voltage stability prediction system 12 may predict post-contingency voltage stability for the power system 10 as a whole or selectively at one or more locations of interest in the power system 10.

Figure 4:
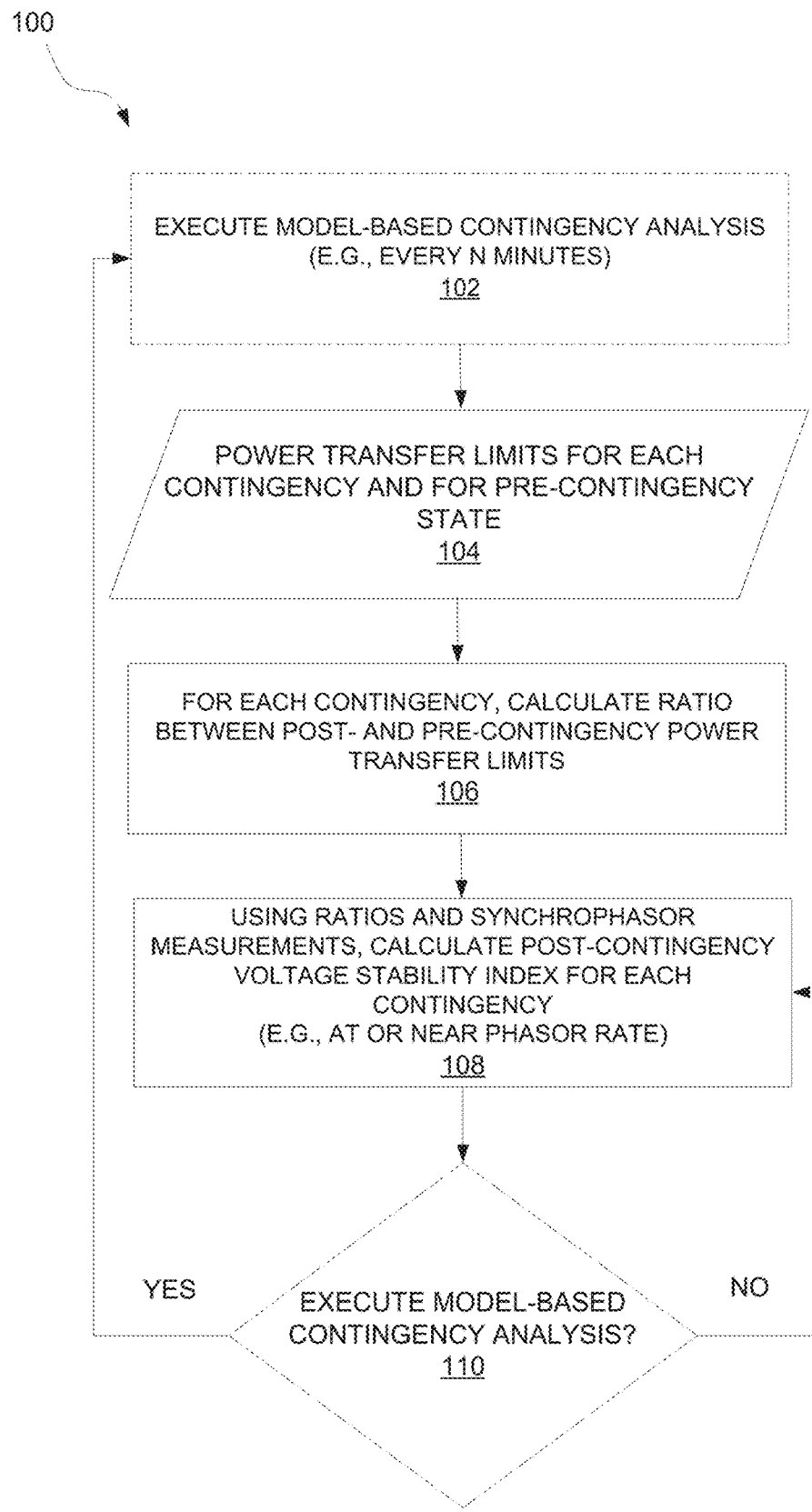
FIG. 4 is a logic flow diagram for processing performed by the voltage stability prediction system according to some embodiments.

FIG. 4 shows additional details of processing 100 performed by the voltage stability prediction system 12 according to some embodiments in this regard that predict post-contingency voltage stability using synchrophasor measurements 26 and a power limit ratio R for each contingency. As shown, processing 100 (e.g., for a location of interest in the power system 10) includes executing the model-based contingency analysis, which may occur for instance every N minutes (Block 102). This analysis may provide as output 24 post-contingency power transfer limits $S_{max-post}^{(T1)}$ for each contingency, as well as a pre-contingency power transfer limit $S_{max-pre}^{(T1)}$ for the pre-contingency (i.e., nominal) state of the power system 10 (Block 104). For each contingency, then, the system calculates a ratio R between the post- and pre-contingency power transfer limits (Block 106). Using these ratios R as well as synchrophasor measurements 26, the system 12 calculates a post-contingency voltage stability index $I_{post}^{(T2)}$ for each contingency (Block 108). The system 12 may calculate such indices for the contingencies at or near phasor rate, e.g., 5-150 times per second.

In some embodiments, the system 12 may next determine whether to execute model-based contingency analysis again (Block 110), e.g., to update its prediction 20 and/or the power transfer limits provided as output 24. If so (YES at Block 110), the system 12 re-iterates processing 100 starting with re-executing the model-based contingency analysis (Block 102). If not (NO at Block 110), the system 12 updates its post-contingency voltages stability index for each contingency using updated synchrophasor measurements and the last computed power limit ratios R (Block 108).

The decision in Block 110 regarding whether to re-execute model-based contingency analysis may be based on determining whether one or more conditions for such re-execution have been met. One such condition may be for instance the passage of a defined amount of time since the last execution of the model-based contingency analysis, such that the analysis is executed periodically. Alternatively or additionally, a condition being met may dynamically and/or aperiodically trigger re-execution of model-based contingency analysis, e.g., so that such analysis is executed earlier than a previously scheduled time. For example, a condition for re-execution may be a change to the topology of the power system 10, e.g., as caused by the occurrence of one or more contingencies. Alternatively or additionally, a condition for re-execution may be that the post-contingency voltage stability index $I_{post}^{(T2)}$ for one or more contingencies meets a certain criteria indicative of unacceptable voltage stability (e.g., a margin for voltage stability of the power system 10 falls below a threshold). Such re-execution may for instance verify whether or not the system 12 is indeed close to voltage instability for the one or more contingencies. Note, though, that in some embodiments when re-execution of model-based contingency analysis is triggered by unacceptable voltage stability for one or more contingencies, such re-execution may be selectively performed only for those one or more contingencies under which voltage stability is unacceptable. This may advantageously speed up re-execution time.

Figure 5A:
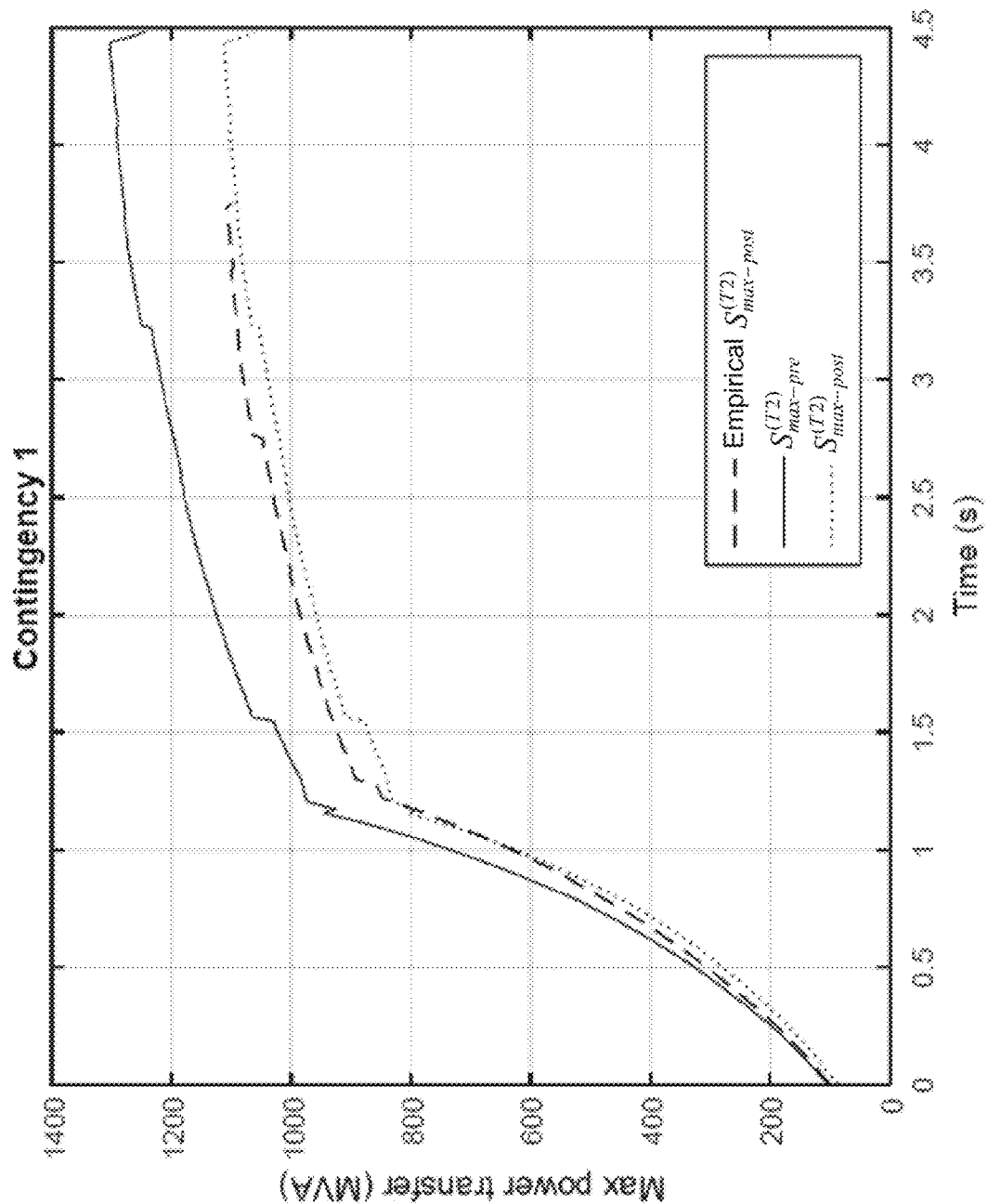
FIGS. 5A-5C are plots of results from simulating voltage stability prediction according to some embodiments.
Figure 5B:
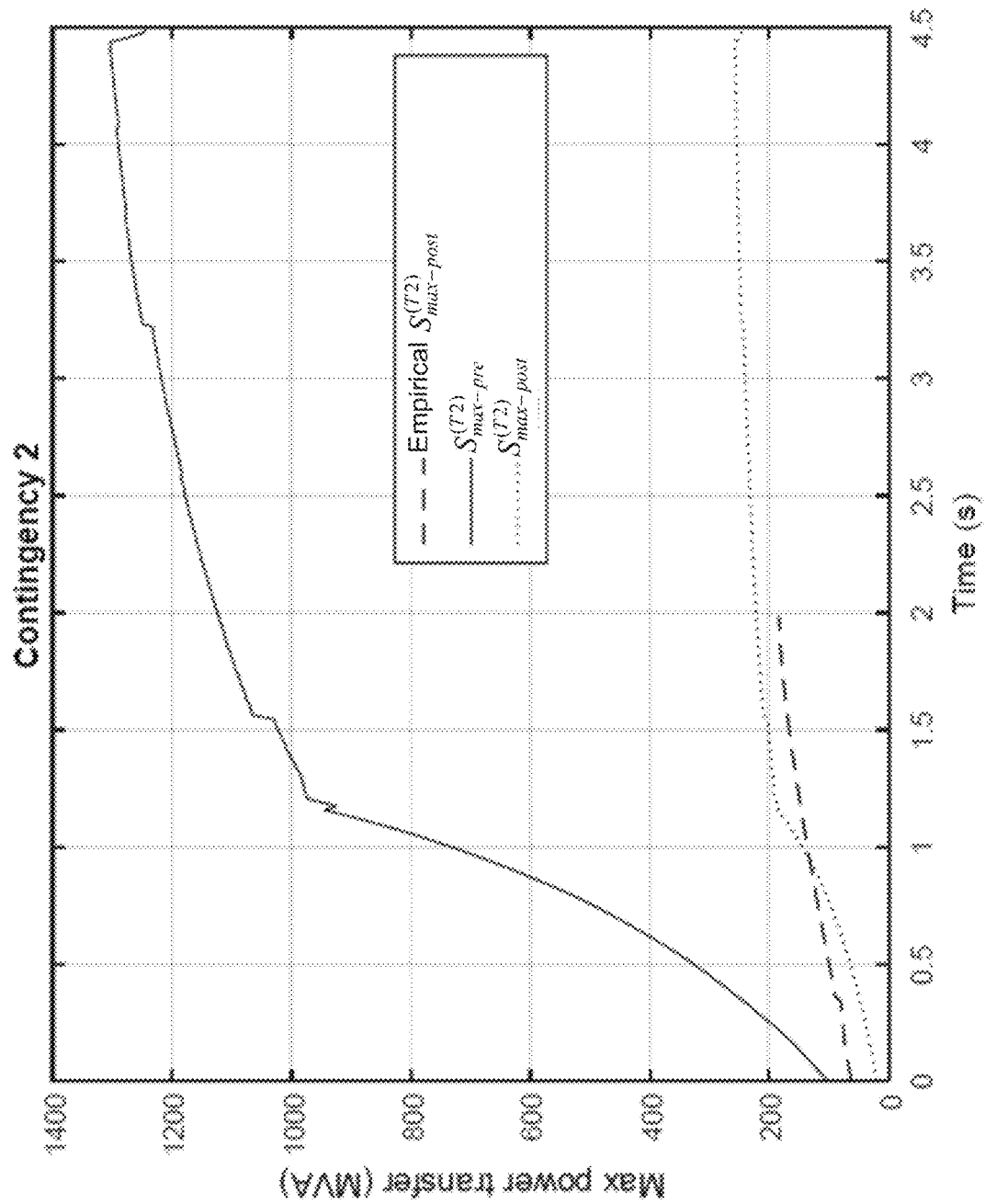
Figure 5C:
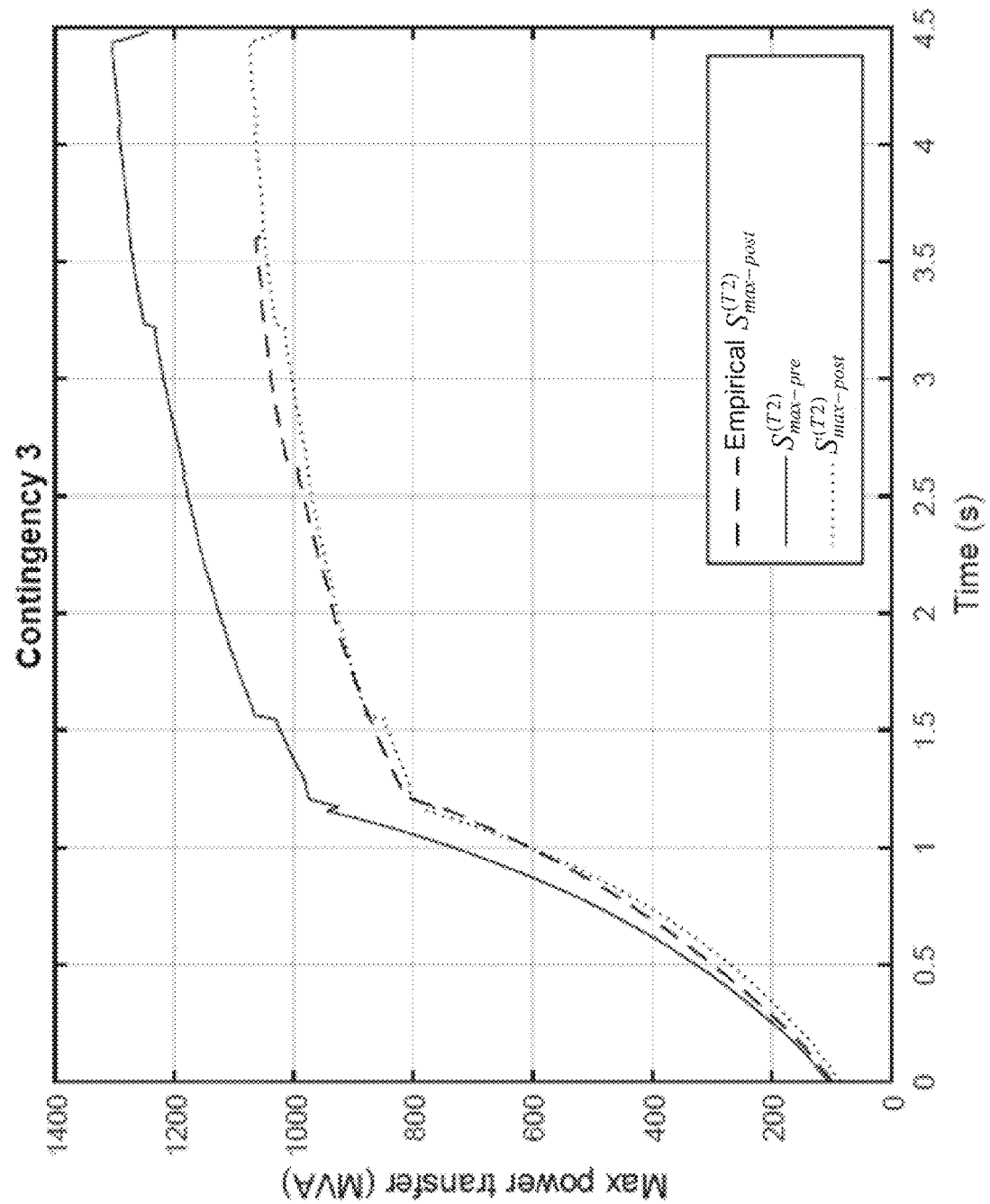

FIGS. 5A-5C illustrate the effectiveness of some embodiments in predicting post-contingency voltage stability. The plots in FIGS. 5A-5C show test results from implementing certain embodiments with respect to a large power system model. In the examples, voltage stability prediction was conducted at a bus within the system for both pre- and post-contingency conditions. The measurement data was simulated using load flows, and the contingencies consisted of line outages close to the bus. The simulations increased the loading at the bus until voltage collapse occurred for both the pre- and post-contingency conditions. As shown, the post-contingency power transfer limit $S_{max\text{-}post}^{(T2)}$ predicted for the contingency according to embodiments herein closely tracked the post-contingency power transfer limit $S_{max\text{-}post}^{(T2)}$ that would have been empirically calculated based purely on synchrophasor measurements performed after contingency occurrence.

Note that although FIG. 1 showed the voltage stability prediction system 12 as including a model-based contingency analyzer 14 for executing model-based contingency analysis, such need not be the case in other embodiments. The voltage stability prediction system 12 in some embodiments may for example predict voltage stability based on the results or other output of model-based contingency analysis that the system 12 receives from a contingency analyzer external to the system 12, e.g., as part of an energy management system (EMS).

Note further that embodiments herein apply to any type or configuration of power system 10. In some embodiments, for example, all or part of the power system 10 may be represented using a bus configuration, a corridor configuration, and/or a load center configuration. In a bus configuration, voltage stability at a bus is evaluated by representing the system as a two-bus equivalent. Voltage stability prediction in this case may exploit synchrophasor measurements of the bus voltage and currents at lines connected to the bus. In a corridor configuration, a transmission corridor is defined as two sets of electrically close buses connected by a number of transmission lines. In this case, voltage stability prediction herein may exploit synchrophasor measurements of the bus voltages on both ends, and currents at all of the lines in the corridor in both directions. In a load center configuration, a load center (that may include some internal generation) is supplied by several feeds from different parts of the system. The feeds can be aggregated together into a single group or several groups, or considered individually. In this case, voltage stability prediction herein may exploit synchrophasor measurements of voltages and currents at both ends of every feed within a group.

Figure 6:
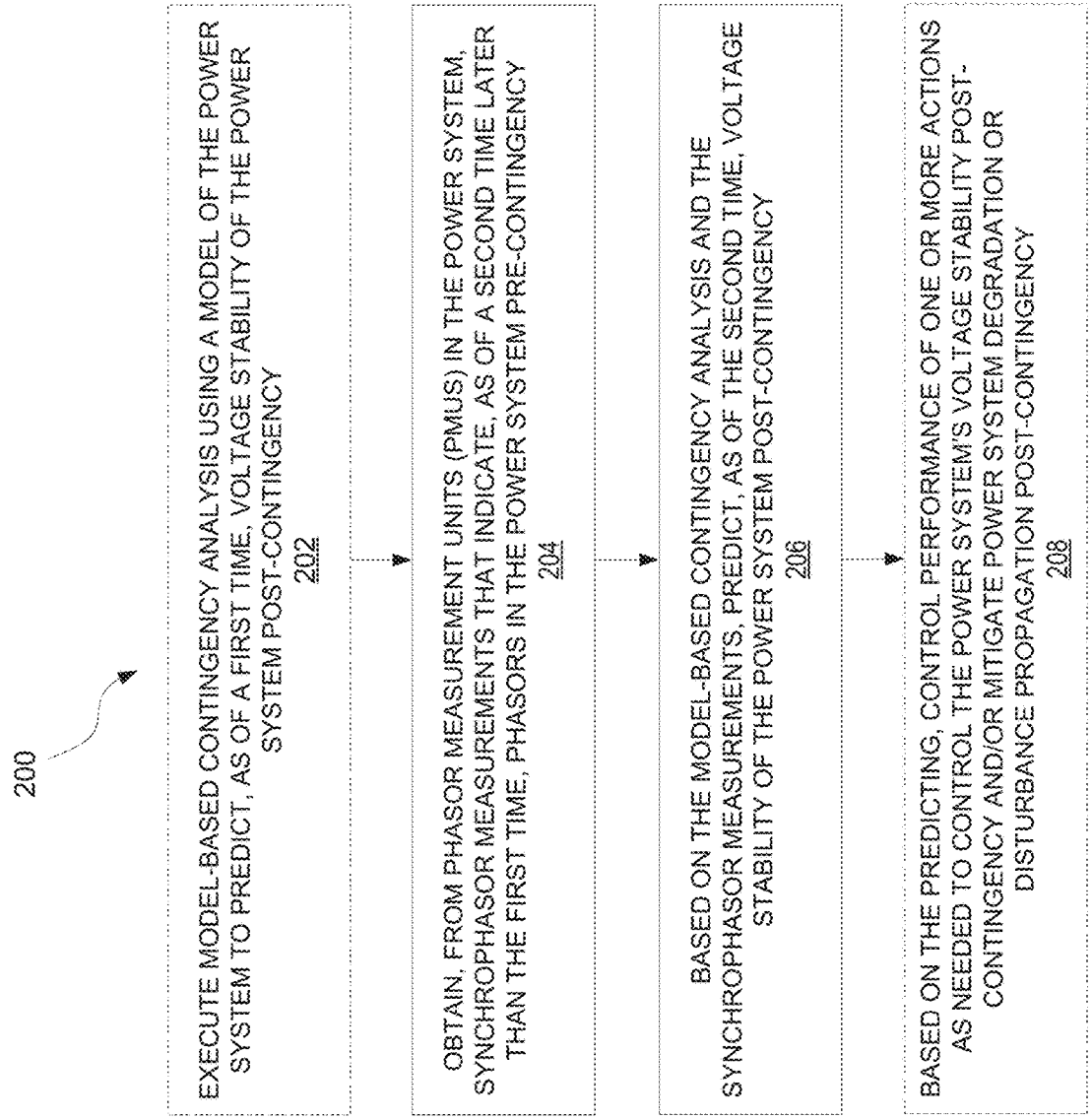
FIG. 6 is a logic flow diagram for processing performed by the voltage stability prediction system according to other embodiments.

In view of the above modifications and variations, FIG. 6 generally illustrates a method 200 performed by the voltage stability prediction system 12 for predicting voltage stability of the power system 10 under a contingency according to some embodiments. The method 200 may comprise executing model-based contingency analysis using a model 18 of the power system 10 to predict, as of a first time T1, voltage stability of the power system 10 post-contingency (Block 202). The method 200 may further comprise obtaining, from phasor measurement units (PMUs) 28 in the power system 10, synchrophasor measurements 26 that indicate, as of a second time T2 later than the first time T1, phasors in the power system 10 pre-contingency (Block 204). The method 200 may also comprise, based on the model-based contingency analysis and the synchrophasor measurements 26, predicting, as of the second time T2, voltage stability of the power system 10 post-contingency (Block 206). In some embodiments, the method 200 may also comprise, based on the predicting (Block 206), controlling performance of one or more actions as needed to control the power system's voltage stability post-contingency and/or mitigate power system degradation or disturbance propagation post-contingency (Block 208).

FIG. 7 illustrates additional details of the predicting in Block 206 according to some embodiments. As shown in FIG. 7, predicting in Block 206 may comprise obtaining, based on the model-based contingency analysis, a ratio between a post-contingency power transfer limit as of the first time T1 and a pre-contingency power transfer limit as of the first time T1 (Block 206A). Furthermore, the predicting may comprise obtaining, based on the synchrophasor measurements 26, a pre-contingency power transfer limit as of the second time T2 (Block 206B). Moreover, the predicting may include obtaining a post-contingency power transfer limit as of the second time T2, e.g., by scaling the pre-contingency power transfer limit as of the second time T2 by the ratio (Block 206C). In some embodiments, the predicting also comprises calculating, based on the post-contingency power transfer limit as of the second time T2, an index that indicates, as of the second time T2, voltage stability of the power system 10 post-contingency (Block 206D).

Note that the voltage stability prediction system 12 as described above may perform the method in FIGS. 6 and/or 7 and any other processing herein by implementing any functional means or units. In one embodiment, for example, the voltage stability prediction system 12 comprises respective circuits or circuitry (e.g., embodied in or across one or more different nodes) configured to perform the steps shown in FIGS. 6 and/or 7. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 8A:
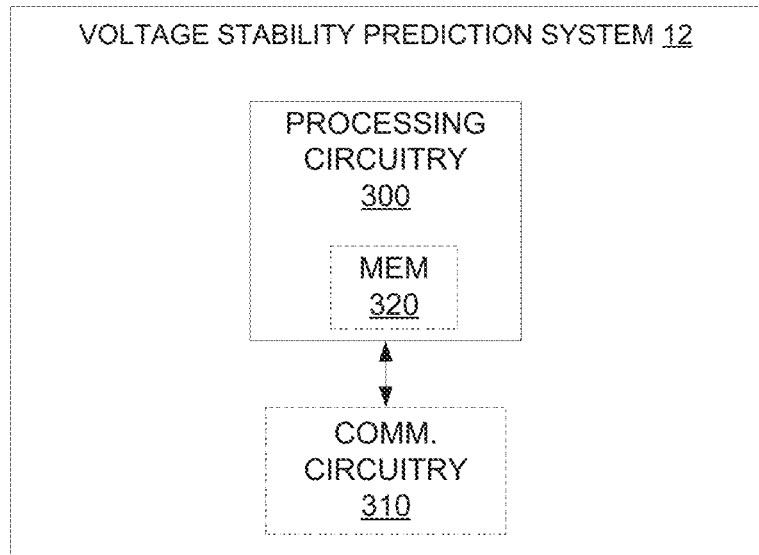
FIG. 8A is a block diagram of a voltage stability prediction system according to some embodiments.

FIG. 8A for example illustrates the voltage stability prediction system 12 in accordance with one or more embodiments. As shown, the voltage stability prediction system 12 includes processing circuitry 300 and communication circuitry (comm. circuitry) 310. The communication circuitry 310 (e.g., in the form of a transmitter, receiver, transceiver, or radio frequency circuitry) is configured to communicatively couple the voltage stability prediction system 12 directly or indirectly to the PMUs 28 deployed in the power system 10, e.g., via any communication technology. The processing circuitry 300 is configured to perform processing described above, e.g., in FIGS. 6 and/or 7, such as by executing instructions stored in memory (MEM) 320. The processing circuitry 300 in this regard may implement certain functional means, units, or modules.

Figure 8B:
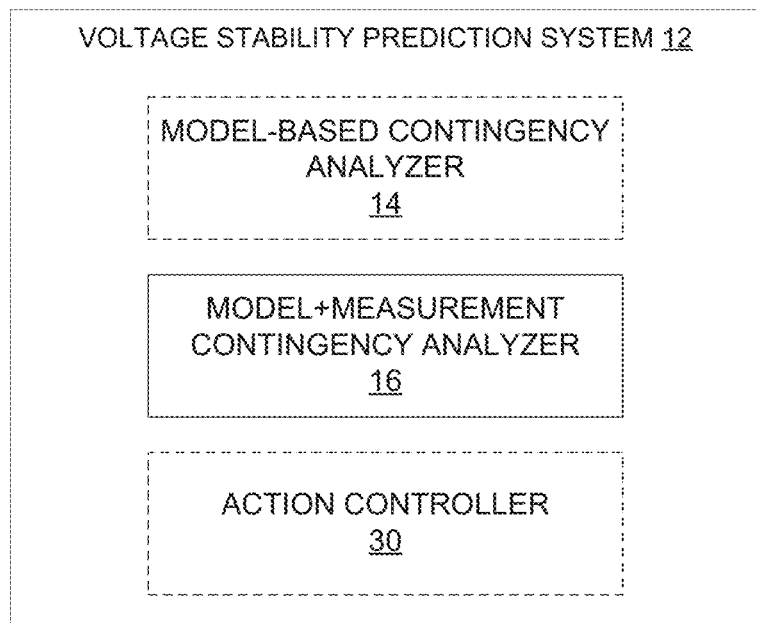
FIG. 8B is a block diagram of a voltage stability prediction system according to other embodiments.

FIG. 8B illustrates the voltage stability prediction system 12 in accordance with one or more other embodiments. As shown, voltage stability prediction system 12 implements various functional means, units, or modules, e.g., via the processing circuitry 300 in FIG. 8A and/or via software code, for implementing the functionality described above (e.g., for implementing the steps in FIG. 6). These functional means, units, or modules include for instance the model-measurement contingency analyzer 16. In some embodiments, the model-based contingency analyzer 14 and/or the action controller 30 are also included in the voltage stability prediction system 12, whereas in other embodiments the model-based contingency analyzer 14 and/or the action controller 30 are external to the system 12.

Those skilled in the art will appreciate that the one or more "circuits" described herein may refer to a combination of analog and digital circuits, and/or one or more processors configured with software stored in memory and/or firmware stored in memory that, when executed by the one or more processors, perform as described herein. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method performed by a voltage stability prediction system for predicting voltage stability of a power system under a contingency, the method comprising:
  periodically executing model-based contingency analysis using a model of the power system to predict, at scheduled times that are each pre-contingency, voltage stability of the power system post-contingency;
  for each of one or more intermediate times between successive ones of the scheduled times:
    obtaining, from phasor measurement units (PMUs) in the power system, synchrophasor measurements that indicate, as of the intermediate time that is pre-contingency, phasors in the power system pre-contingency; and
    based on the synchrophasor measurements and on the model-based contingency analysis executed to predict post-contingency voltage stability at a last scheduled time before the intermediate time, predicting, as of the intermediate time, voltage stability of the power system post-contingency; and
  based on the voltage stability of the power system post-contingency predicted as of at least one of the one or more intermediate times, performing one or more actions to control the power system's voltage stability post-contingency and/or mitigate power system degradation or disturbance propagation post-contingency.

2. The method of claim 1, wherein, for each of the one or more intermediate times between successive ones of the scheduled times, predicting, as of the intermediate time, voltage stability of the power system post-contingency comprises:
  obtaining, based on the model-based contingency analysis, a ratio between (i) a post-contingency power transfer limit as of the last scheduled time before the intermediate time and (ii) a pre-contingency power transfer limit as of the last scheduled time before the intermediate time; and
  predicting, as of the intermediate time, voltage stability of the power system post-contingency based on the synchrophasor measurements obtained as of the intermediate time and based on the obtained ratio.

3. The method of claim 2, wherein, for each of the one or more intermediate times between successive ones of the scheduled times, predicting, as of the intermediate time, voltage stability of the power system post-contingency comprises:
  obtaining, based on the synchrophasor measurements obtained as of the intermediate time, a pre-contingency power transfer limit as of the intermediate time; and
  predicting, as of the intermediate time, voltage stability of the power system post-contingency based on the obtained ratio and based on the pre-contingency power transfer limit as of the intermediate time.

4. The method of claim 3, wherein predicting, as of the intermediate time, voltage stability of the power system post-contingency based on the obtained ratio and based on the pre-contingency power transfer limit as of the intermediate time comprises obtaining a post-contingency power transfer limit as of the intermediate time by scaling the pre-contingency power transfer limit as of the intermediate time by the ratio.

5. The method of claim 4, wherein predicting, as of the intermediate time, voltage stability of the power system post-contingency based on the obtained ratio and based on the pre-contingency power transfer limit as of the intermediate time further comprises calculating, based on the post-contingency power transfer limit as of the intermediate time, an index that indicates, as of the intermediate time, voltage stability of the power system post-contingency.

6. The method of claim 5, wherein the index is a power margin of the power system post-contingency.

7. The method of claim 1, wherein the one or more intermediate times between successive ones of the scheduled times include multiple intermediate times that recur between the successive ones of the scheduled times at a rate between 5 and 150 times per second.

8. The method of claim 1, further comprising, responsive to determining that the contingency has occurred or that a margin for voltage stability of the power system post-contingency falls below a threshold, executing the model-based contingency analysis earlier than a previously scheduled time.

9. The method of claim 1, wherein the one or more actions include:
  configuring operating constraints of the power system to avoid triggering the contingency; and/or
  shedding load on the power system.

10. The method of claim 1, wherein the one or more intermediate times between successive ones of the scheduled times include multiple intermediate times that recur at a synchrophasor data rate such that post-contingency voltage stability is predicted at the synchrophasor data rate.

11. A voltage stability prediction system for predicting voltage stability of a power system under a contingency, the voltage stability prediction system comprising:
a receiver; and
one or more processing circuits configured to:
periodically execute model-based contingency analysis using a model of the power system to predict, at scheduled times that are each pre-contingency, voltage stability of the power system post-contingency;
for each of one or more intermediate times between successive ones of the scheduled times:
obtain, from phasor measurement units (PMUs) in the power system, synchrophasor measurements that indicate, as of the intermediate time that is pre-contingency, phasors in the power system pre-contingency; and
based on the synchrophasor measurements and on the model-based contingency analysis executed to predict post-contingency voltage stability at a last scheduled time before the intermediate time, predict, as of the intermediate time, voltage stability of the power system post-contingency; and
based on the voltage stability of the power system post-contingency predicted as of at least one of the one or more intermediate times, perform one or more actions to control the power system's voltage stability post-contingency and/or mitigate power system degradation or disturbance propagation post-contingency.

12. The voltage stability prediction system of claim 11, wherein, for each of the one or more intermediate times between successive ones of the scheduled times, the one or more processing circuits are configured to predict, as of the intermediate time, voltage stability of the power system post-contingency by:
obtaining, based on the model-based contingency analysis, a ratio between (i) a post-contingency power transfer limit as of the last scheduled time before the intermediate time and (ii) a pre-contingency power transfer limit as of the last scheduled time before the intermediate time; and
predicting, as of the intermediate time, voltage stability of the power system post-contingency based on the synchrophasor measurements obtained as of the intermediate time and based on the obtained ratio.

13. The voltage stability prediction system of claim 12, wherein, for each of the one or more intermediate times between successive ones of the scheduled times, the one or more processing circuits are configured to predict, as of the intermediate time, voltage stability of the power system post-contingency by:
obtaining, based on the synchrophasor measurements obtained as of the intermediate time, a pre-contingency power transfer limit as of the intermediate time; and
predicting, as of the intermediate time, voltage stability of the power system post-contingency based on the obtained ratio and based on the pre-contingency power transfer limit as of the intermediate time.

14. The voltage stability prediction system of claim 13, wherein the one or more processing circuits are configured to predict, as of the intermediate time, voltage stability of the power system post-contingency based on the obtained ratio and based on the pre-contingency power transfer limit as of the intermediate time by obtaining a post-contingency power transfer limit as of the intermediate time, wherein the by one or more processing circuits are configured to obtain the post-contingency power transfer limit as of the intermediate time by scaling the pre-contingency power transfer limit as of the intermediate time by the ratio.

15. The voltage stability prediction system of claim 14, wherein the one or more processing circuits are configured to predict, as of the intermediate time, voltage stability of the power system post-contingency based on the obtained ratio and based on the pre-contingency power transfer limit as of the intermediate time by calculating, based on the post-contingency power transfer limit as of the intermediate time, an index that indicates, as of the intermediate time, voltage stability of the power system post-contingency.

16. The voltage stability prediction system of claim 15, wherein the index is a power margin of the power system post-contingency.

17. The voltage stability prediction system of claim 11, wherein the one or more intermediate times between successive ones of the scheduled times include multiple intermediate times that recur between the successive ones of the scheduled times at a rate between 5 and 150 times per second.

18. The voltage stability prediction system of claim 11, wherein the one or more processing circuits are configured to, responsive to determining that the contingency has occurred or that a margin for voltage stability of the power system post-contingency falls below a threshold, execute the model-based contingency analysis earlier than a previously scheduled time.

19. The voltage stability prediction system of claim 11, wherein the one or more actions include:
configuring operating constraints of the power system to avoid triggering the contingency; and/or
shedding load on the power system.

20. The voltage stability prediction system of claim 11, wherein the one or more intermediate times between successive ones of the scheduled times include multiple intermediate times that recur at a synchrophasor data rate such that post-contingency voltage stability is predicted at the synchrophasor data rate.

21. A non-transitory computer readable medium comprising instructions stored thereon that, when executed by a processor of a voltage stability prediction system, causes the voltage stability prediction system to predicting voltage stability of a power system under a contingency, by:
periodically executing model-based contingency analysis using a model of the power system to predict, at scheduled times that are each pre-contingency, voltage stability of the power system post-contingency;
for each of one or more intermediate times between successive ones of the scheduled times:
obtaining, from phasor measurement units (PMUs) in the power system, synchrophasor measurements that indicate, as of the intermediate time that is pre-contingency, phasors in the power system pre-contingency; and
based on the synchrophasor measurements and on the model-based contingency analysis executed to predict post-contingency voltage stability at a last scheduled time before the intermediate time, predicting, as of the intermediate time, voltage stability of the power system post-contingency; and
based on the voltage stability of the power system post-contingency predicted as of at least one of the one or more intermediate times, performing one or more actions to control the power system's voltage stability post-contingency and/or mitigate power system degradation or disturbance propagation post-contingency.

22. The non-transitory computer readable medium of claim 21, wherein the one or more actions include:
configuring operating constraints of the power system to avoid triggering the contingency; and/or
shedding load on the power system.

\* \* \* \* \*